US007877603B2

(12) United States Patent
Goodman et al.

(10) Patent No.: US 7,877,603 B2
(45) Date of Patent: Jan. 25, 2011

(54) CONFIGURING A STORAGE DRIVE TO COMMUNICATE WITH ENCRYPTION AND KEY MANAGERS

(75) Inventors: Brian Gerard Goodman, Tucson, AZ (US); Paul Merrill Greco, Tucson, AZ (US); Glen Alan Jacquette, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 11/530,022

(22) Filed: Sep. 7, 2006

(65) Prior Publication Data

US 2008/0065882 A1 Mar. 13, 2008

(51) Int. Cl.
*H04L 9/00* (2006.01)
*G06F 21/00* (2006.01)
(52) U.S. Cl. ...................... 713/165; 713/193
(58) Field of Classification Search .................. 713/165
See application file for complete search history.

(56) References Cited

U.S. PATENT DOCUMENTS

| 5,022,076 | A |   | 6/1991  | Rosenow et al. |
|-----------|---|---|---------|----------------|
| 5,983,350 | A | * | 11/1999 | Minear et al. ................. 726/11 |
| 6,023,643 | A |   | 2/2000  | Jesionowski |
| 6,295,361 | B1|   | 9/2001  | Kadansky et al. |
| 6,567,914 | B1|   | 5/2003  | Just et al. |
| 6,915,434 | B1|   | 7/2005  | Kuroda et al. |
| 6,918,040 | B2|   | 7/2005  | Ries et al. |
| 6,950,522 | B1|   | 9/2005  | Mitchell et al. |
| 6,954,753 | B1|   | 10/2005 | Jeran |
| 7,013,389 | B1|   | 3/2006  | Srivastava et al. |
| 2001/0029520 | A1| * | 10/2001 | Miyazaki et al. ............ 709/200 |
| 2002/0150250 | A1| * | 10/2002 | Kitaya et al. ................ 380/277 |
| 2002/0164035 | A1|   | 11/2002 | Yokota et al. |

(Continued)

FOREIGN PATENT DOCUMENTS

EP    0911738 A2    4/1999

(Continued)

OTHER PUBLICATIONS

International Search Report & Written Opinion dated Nov. 19, 2007 for Application No. PCT/EP2007/059094 filed Aug. 31, 2007.

(Continued)

*Primary Examiner*—Gilberto Barron, Jr.
*Assistant Examiner*—David Le
(74) *Attorney, Agent, or Firm*—David W. Victor; Konrad Raynes & Victor LLP (57) ABSTRACT

Provided are a method, system, and article of manufacture for configuring a storage drive to communicate with encryption and key managers. A storage drive receives a request to access a coupled removable storage media for drive operations. The storage drive obtains encryption status for the coupled removable storage media from an encryption manager. The storage drive determines from the obtained encryption status whether to encrypt the coupled removable storage media to access. The storage drive obtains at least one key from a key manager in response to determining to encrypt with respect to the coupled removable storage media. The storage drive performs data operations using the at least one key to encrypt data.

46 Claims, 5 Drawing Sheets

U.S. PATENT DOCUMENTS

| | | |
|---|---|---|
| 2003/0048905 A1* | 3/2003 | Gehring et al. ............. 380/270 |
| 2003/0081787 A1 | 5/2003 | Kallahalla et al. |
| 2003/0099362 A1 | 5/2003 | Rollins |
| 2005/0044170 A1* | 2/2005 | Cox et al. ................... 709/217 |
| 2005/0071591 A1 | 3/2005 | Goodman et al. |
| 2005/0086471 A1 | 4/2005 | Spencer |
| 2005/0204161 A1 | 9/2005 | Caronni |
| 2005/0207570 A1 | 9/2005 | Yamamoto et al. |
| 2005/0226423 A1 | 10/2005 | Li et al. |
| 2006/0053282 A1 | 3/2006 | McCown et al. |
| 2006/0062383 A1 | 3/2006 | Kaneda et al. |
| 2006/0236129 A1* | 10/2006 | Mimatsu ..................... 713/193 |
| 2006/0265550 A1* | 11/2006 | Sakaguchi et al. .......... 711/122 |
| 2007/0180239 A1* | 8/2007 | Fujibayashi et al. ......... 713/165 |

FOREIGN PATENT DOCUMENTS

| | | |
|---|---|---|
| EP | 1736848 A1 | 12/2006 |
| WO | 2005096120 | 10/2005 |

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A. Fisher, andL.G. Jesionowski.

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette and J.M. Karp.

U.S. Patent Application entitled "Keyless Encrypted Data", U.S. Appl. No. 11/530,008, filed Sep. 7, 2006, by inventors P.M. Greco and G.A. Jaquette.

U.S. Patent Application entitled "Key Generation and Retrieval Using Key Servers", U.S. Appl. No. 11/530,006, filed Sep. 7, 2006, by inventors P.M. Greco,.T.J. Hahn and G.A. Jaquette.

U.S. Patent Application entitled "Maintaining Encryption Key Integrity", U.S. Appl. No. 11/530,012, filed Sep. 7, 2006, by inventors P.M. Greco, M.J. Sandberg and S.J. Schaffer.

U.S. Patent Application entitled "Encryption Policy Based on Data Context Recognition", U.S. Appl. No. 11/530,011, filed Sep. 7, 2006, by inventors P.M. Greco, G.A. Jaquette, and W.D. Rhoten.

U.S. Patent Application entitled "Detection and Handling of Encryption Key and Initialization Vector", U.S. Appl. No. 11/530,010, filed Sep. 7, 2006, by inventors P.M. Greco, M.J. Sandberg and S.J. Schaffer.

U.S. Patent Application entitled "Verification of Encryption Key", U.S. Appl. No. 11/530,009, filed Sep. 7, 2006, by inventors P.M. Greco, S. Halevi and G.A. Jaquette.

U.S. Patent Application entitled "Automatically Filling a Drive Table", U.S. Appl. No. 11/530,013, filed Sep. 7, 2006, by inventors T.J. Hahn and G.A. Jaquette.

U.S. Patent Application entitled "Validating an Encryption Key File on Removable Storage Media", U.S. Appl. No. 11/530,019, filed Sep. 7, 2006, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, by inventors B.G. Goodman and L.G. Jesionowski.

U.S. Patent Application entitled "Secure Transmission of Cryptographic Key", U.S. Appl. No. 11/530,014, filed Sep. 7, 2006, by inventors P.M. Greco, M.J. Sandberg, and S.J. Schaffer.

U.S. Patent Application entitled "Rekeying Encryption for Removable Storage Media", U.S. Appl. No. 11/470,964, filed Sep. 7, 2006, by inventors J.A. Fisher, B.G. Goodman, G.A. Jaquette, and L.F. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, by inventors P.M. Greco, S. Halevi, and G.A. Jaquette.

Communication pursuant to Article 94(3) EPC dated Jun. 23, 2010 for Application No. 07 803 100.2 - 1245, IBM Ref.

Response dated Oct. 19, 2010 to Communication pursuant to Article 94(3) EPC dated Jun. 23, 2010 for Application No. 07 803 100.2 - 1245, IBM Ref.

* cited by examiner

CONFIGURING A STORAGE DRIVE TO COMMUNICATE WITH ENCRYPTION AND KEY MANAGERS

BACKGROUND OF THE INVENTION

1. Field of the Invention

The present invention relates to a method, system, and article of manufacture for configuring a storage drive to communicate with encryption managers and key managers.

2. Description of the Related Art

Data stored in removable media cartridges may be encrypted by an encryption engine to protect the data. Data encryption is especially useful for businesses that store personal data on their customers. Recent government regulations place requirements and legal obligations about companies storing personal data to report any loss of storage media containing personal information which was not encrypted.

The encryption engine handling the encryption and decryption of the data in removable media cartridges can be implemented in an application program in the host system or in a system program, such as the file system, operating system, device driver, etc. Incorporating the encryption engine in the application program or system program can place substantial computational burdens on the host system.

A "bump in the wire" solution comprises an encryption device between the host system and the storage drive coupled to the removable media cartridge that encrypts and decrypts data being transferred between the host system and the storage drive. With many different data paths between host systems and storage drives in a library or data center, this can be a costly and complex solution.

The encryption engine may be implemented in the storage drive to encrypt some or all of the data. Encrypting at the storage drive creates new challenges of when to encrypt data and where and how to obtain any required encryption keys. In many cases, different keys may be required for different removable media cartridges.

There is a need in the art for techniques in the art to manage encryption keys and encryption operations for encrypting a removable storage media, such as a removable media cartridge.

SUMMARY

Provided are a method, system, and article of manufacture for configuring a storage drive to communicate with encryption and key managers. A storage drive receives a request to access a coupled removable storage media for drive operations. The storage drive obtains encryption status for the coupled removable storage media from an encryption manager. The storage drive determines from the obtained encryption status whether to encrypt the coupled removable storage media to access. The storage drive obtains at least one key from a key manager in response to determining to encrypt with respect to the coupled removable storage media. The storage drive performs data operations using the at least one key to encrypt data.

DETAILED DESCRIPTION

Figure 1:
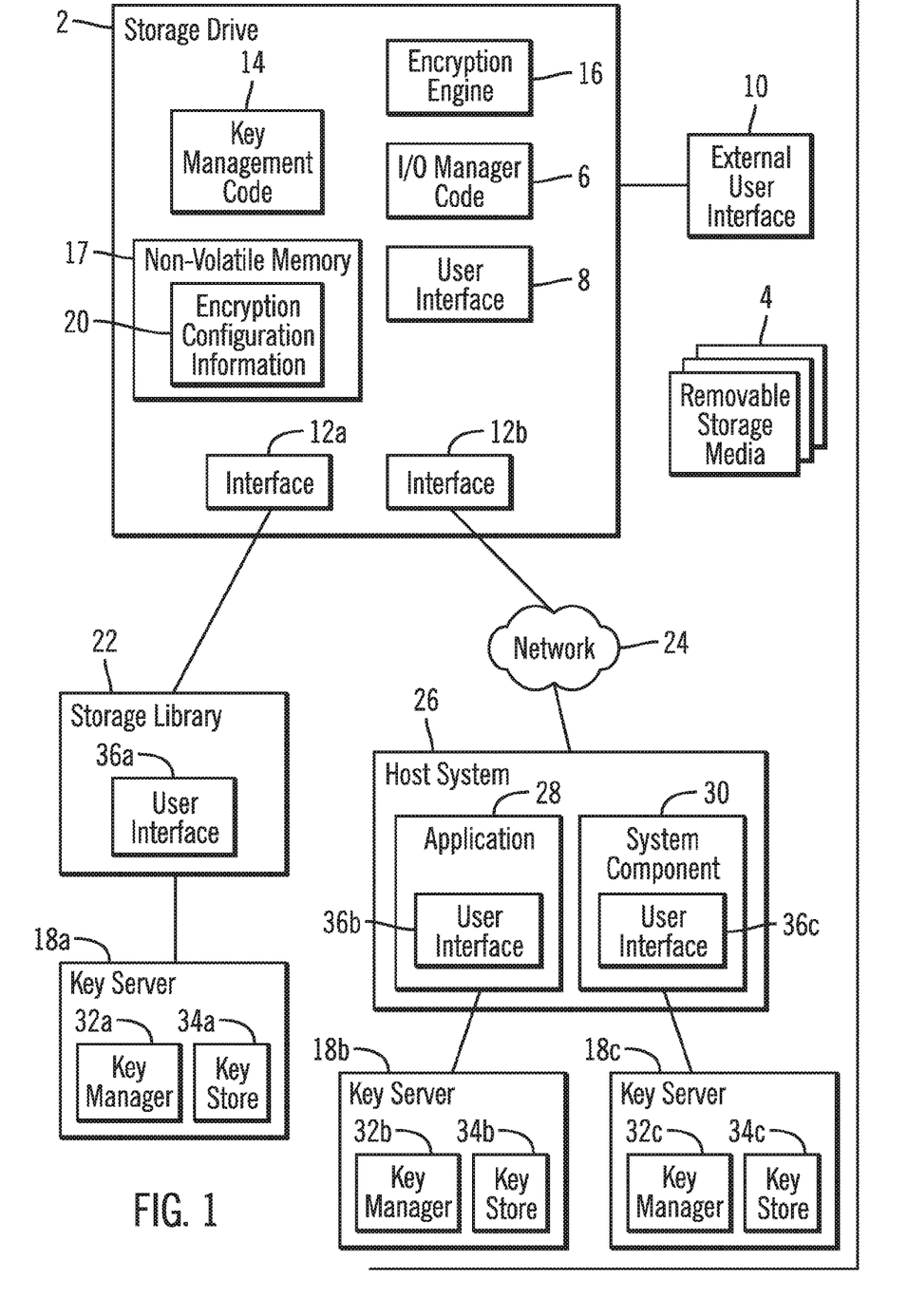
FIG. 1 illustrates an embodiment of a computing environment.

FIG. 1 illustrates an embodiment of a computing environment. A storage drive 2 is capable of being coupled to one of a plurality of removable storage media 4 to perform read and/or write operations with respect to the coupled removable storage media 4. The storage drive 2 includes I/O manager code 6 to perform read/write operations with respect to a coupled removable storage media 4. The storage drive 2 includes a user interface 8 comprising user controls on the storage drive 2 to configure and/or control the storage drive. Further, in certain embodiments, an external user interface 10 may optionally be coupled to the storage drive providing additional user controls used to configure and/or control the storage drive 2. The storage drive 2 may further include communication interfaces 12a, 12b, key management code 14, an encryption engine 16, and a non-volatile memory 17, such as, but not limited to, PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CD (Compact Disk), DVD (Digital Versatile Disk), hard disk drives, etc.

The removable storage media 4 may comprise any type of media on which data may be stored and which may serve as removable media, including but not limited to magnetic media (such as magnetic tape or disks), optical media (such as optical tape or disks), holographic media (such as holographic cards, tapes or disks), electronic media (such as PROM, EEPROM, flash PROM, MRAM, CompactFlash™, Smartmedia™, Memory Stick™, etc.), or other suitable media. In certain embodiments, the removable storage media has a cartridge housing, such as the case with a magnetic tape cartridge or an optical disk cartridge.

The user interface 8 and/or optional external user interface 10 may include user interface elements for interacting with the storage drive 2, such as an eject button for manually unloading removable storage media 4, up/down buttons for navigating a list of items, enter/exit buttons for selecting items or exiting from a menu or list, and one or more status displays (e.g., a light or LED (Light Emitting Diode), a numeric display, an alphanumeric display, etc.) The external user interface 10 may comprise a computer, workstation, personal computer, palm computer, operator panel, entry keys, a display, web user interface, proprietary user interface, or any other device or interface capable of providing a user interface for the storage drive 2.

The key management code 14 may be used to obtain one or more encryption keys from a key manager 32a, 32b, 32c to provide to the encryption engine 16 to use to encrypt and/or decrypt data with respect to the coupled removable storage media 4. The encryption engine 16 may utilize symmetric encryption algorithms, asymmetric encryption algorithms, or combinations of symmetric and asymmetric encryption algorithms, such as but not limited to DES (Data Encryption Standard), Triple DES, AES (Advanced Encryption Standard), IDEA (International Data Encryption Algorithm), Twofish, Blowfish, Serpent, CAST5, ARC4, RSA (Rivest Shamir Adleman), Diffie-Hellman, DSS (Digital Signature Standard), etc.

In one embodiment, the key management code 14 obtains one or more keys to encrypt and/or decrypt data on the removable storage media 4. The keys may comprise data keys and/or may comprise one or more key encrypting keys (KEK). The data key is used to encrypt/decrypt data on the removable storage media while the KEK (if present) is used to secure or protect (wrap or encrypt) the data key. The KEK allows the data key(s) to be stored on the removable storage media 4. If keys are stored on the removable storage media, they may be stored in an associated cartridge memory or they may be stored on the media itself. A cartridge memory may comprise any type of wired or wireless memory or RFID tag associated with a data storage cartridge as known in the art. An example of a removable media cartridge that contains a wireless cartridge memory is the LTO (Linear Tape Open) Ultrium tape cartridge. An example of a removable media cartridge that contains a wired cartridge memory is the Sony AIT (Advanced Intelligent Tape) cartridge.

The key management code 14, encryption engine 16, and I/O manager code 6 may be implemented as hardware logic in the storage drive 2 or in computer executable instructions that are accessed and executed by one or more processors (not shown) in the storage drive 2.

The storage drive 2 includes different interfaces 12a, 12b to enable communication with different devices, such as interface 12a used to communicate with storage library 22 and interface 12b used to communicate with a network 24 and the host system 26 over the network 24. There may be additional communication interfaces for connecting to different devices or host computers. In addition, there may be redundant interfaces to improve reliability, availability, connectivity, or performance. In one embodiment, the interfaces 12a, 12b may comprise different interfaces and implement different communication protocols. For instance, the interface 12a may comprise a serial or parallel interface to communicate with storage library 22 and the interface 12b may comprise a network interface to communication with the network 24, such as an interface implementing a TCP/IP protocol to communicate with a Local Area Network or an interface implementing the Fibre Channel protocol to communicate with a Storage Area Network. Interface 12a and/or 12b may comprise serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, interface 12a and/or 12b may comprise network or wireless interfaces such as Ethernet, SAN (Storage Area Network), WAN (Wide Area Network), CAN (Controller Area Network), 802.11 (Wi-Fi), X.25 (WAN), Bluetooth, etc. Still further, interface 12a and/or 12b may comprise combinations thereof In one embodiment, the interface 12b may comprise an in-band network interface enabling communication of read/write requests from host system 26 to the storage drive 2. The interface 12a may comprise an out-of-band interface through which the connected storage library 22 (or other device) may provide commands and/or data to configure the storage drive 2. Interface 12a and/or 12b may be used to configure the storage drive 2 with respect to key management and may be used to provide configuration information 20 to the storage drive 2.

The storage library 22 may comprise an automated information storage and retrieval system, also known as an automated data storage library, that includes an array of storage cells, i.e., storage slots, that hold removable media, as discussed above. A picker assembly in the automated library may move the tape cartridges between the slots and one or more tape drives available to the library system, where the tape drives implement the components of the storage drive 2 in FIG. 1. An example of a library is the IBM 3584 UltraScalable Tape Library. An example of a tape drive is the IBM 3592 Tape Drive.

The host system 26 includes an application program 28, such as a backup program, archival software or any other host application that manages data. An example of an application program is the IBM Tivoli Storage Manager. The host system 26 also includes one or more system components 30, which may comprise a host system program, such as an operating system, file system, device driver, DLL (Dynamic Link Library), etc. The storage library 22, application 28, and system component 30 may be coupled to an associated key server 18a, 18b, 18c. The storage drive 2 may submit encryption key requests for key manager 32a, 32b, 32c (associated with key server 18a, 18b, 18c respectively), or to the coupled storage library 22, application 28, and/or system component 30, which may operate as a proxy for their coupled key managers 32a, 32b, 32c. Alternatively, the storage drive 2 may send encryption key requests directly to the key servers 18a, 18b, 18c or key managers 32a, 32b, 32c or there be a key server directly connected to storage drive 2 (not shown).

The key servers 18a, 18b, 18c each include a key manager 32a, 32b, 32c to perform key related operations, and a key store 34a, 34b, and 34c, respectively. Herein, key server and key manager may refer to a key manager, a key server, or both. The key store 34a, 34b, 34 may comprise a database storing encryption keys (i.e. KEKs and/or data keys) that are used to encrypt and/or decrypt data to/from different removable storage media 4. The key stores 34a, 34b, 34c may comprise a software element such as an array, structure, database, file, etc. In addition, a key store may comprise a hardware element such as memory, media, a hard drive, storage device, etc. The key servers 18a, 18b, 18c may further include a user interface to enable a user to perform key management operations with respect to the key manager 32a, 32b, 32c.

In FIG. 1, the key manager 32a, 32b, 32c and key stores 34a, 34b, 34c are maintained in separate key server 18a, 18b, 18c devices that provide key management services to the coupled storage library 22, application 28, system component 30, and/or storage drive 2. The computing environment of FIG. 1 may comprise a single key server or may comprise multiple key servers as shown in FIG. 1. In an alternative embodiment, the key manager and key stores may be implemented within the storage library 22, application 28, system component 30, or host system 26. In this case, there may not be any key servers. In an additional embodiment, the computing environment may include a single key manager, instead of the multiple key managers shown in FIG. 1. For example, library 22 may comprise a key manager (not shown) and there may not be any other key managers.

The storage library 22, application 28, and system component 30 are each shown with an optional user interface 36a, 36b, 36c, which may be used to provide configuration information, such as encryption configuration information. The configuration information may be provided to the respective storage library 22, application 28, and system component 30 and/or it may be provided to the storage drive 2. Encryption configuration information provided by the user interfaces 36a, 36b, 36c, 8, and 10 may be stored as encryption configuration information 20 in the non-volatile memory 17. Alternatively, part or all of the configuration information 20 may be stored in the library 22, the host application 28, and/or the system component 30, as will be discussed. The optional user interfaces 36a, 36b, and/or 36c may comprise a computer, workstation, personal computer, palm computer, operator panel, entry keys and a display, web user interface, proprietary user interface, or any other device or interface capable of providing a user interface for the storage library 22, application 28, and/or system component 30. In addition, the host system 26 may comprise a user interface, and interface 36b and/or interface 36c may comprise the host system interface.

Figure 2:
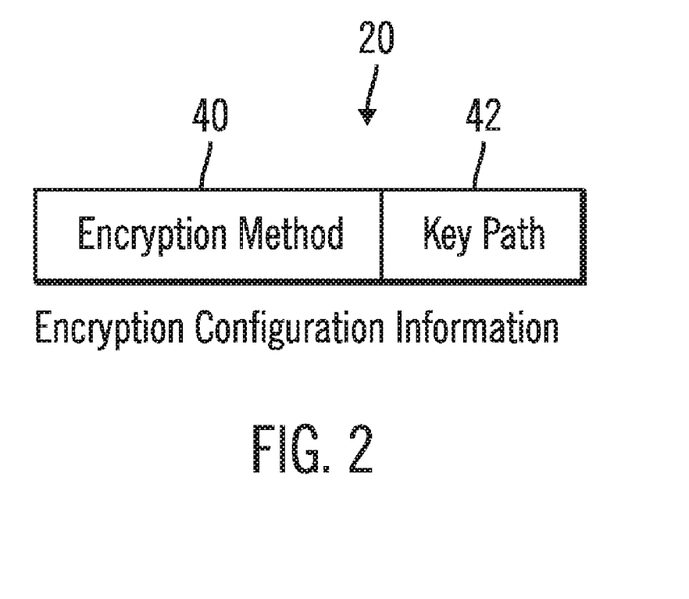
FIG. 2 illustrates an embodiment of encryption configuration information.

FIG. 2 illustrates the encryption configuration information 20 as having an encryption method 40 and key path 42. An encryption method specifies where and/or when the decision is made to encrypt data. For example, an encryption method may indicate application-managed encryption, system-managed encryption, or library-managed encryption. With application-managed encryption, a host application determines which data and/or which cartridges should be encrypted. An example of a host application capable of application-managed encryption is the IBM Tivoli Storage Manager. With system-managed encryption, a host system component determines which data and/or which cartridges should be encrypted. Examples of a host system component include, but without limitation, an operating system, a file system, a device driver, a DLL (Dynamic Link Library), etc. With library-managed encryption, a library determines which data and/or which cartridges should be encrypted. Additionally or alternatively, the encryption method 40 may indicate one or more encryption managers 22, 28 and/or 30 that instruct the storage drive 2 on whether to perform encryption and/or decryption with respect to a coupled removable storage media 4. An encryption manager may comprise a hardware and/or software component, independent from storage drive 2, that assists with encryption related activities. These activities may comprise, without limitation, the passing of keys, determining when to encrypt, what to encrypt, configuring encryption settings, etc. As a result, library 22, application 28, system component 30, host system 26, key server 18a, 18b, 18c, key manager 32a, 32b, 32c may comprise encryption managers. Still further, the encryption method 40 may indicate an interface or path that will be used to instruct the storage drive 2 on whether to perform encryption and/or decryption with respect to a coupled removable storage media 4. For example, the encryption method 40 may indicate interface 12a as the interface for providing information about when to encrypt data.

The key path 42 indicates the path or particular interface 12a, 12b through which the encryption keys should be transmitted. For example, the key path 42 may indicate interface 12a. In this case, if a storage drive 2 needed any encryption keys, it would request the key(s) through interface 12a. A particular interface may be identified by a port, UART, transceiver, channel, address, alias, etc. Alternatively, the key path 42 may comprise a particular key server 18a, 18b, 18c or a particular key manager 32a, 32b, 32c through which the keys should be transmitted. A key server and/or key manager may be identified by an IP address, MAC address, World Wide Name, host name, alias, port number, or any other method of identifying one device from another. Still further, the key path 42 may comprise an encryption method (application-managed, system-managed, library-managed) and the method is an indicator of the path. For example, the encryption method 40 may comprise "system" to indicate that a system component will determine when encryption should performed and the key path 42 may comprise "library" to indicate that any needed keys will come from the library. In the example of FIG. 1, "system" may indicate interface 12b and "library" may indicate interface 12a.

The key path 42 may comprise the same information as the encryption method 40. For example, they may comprise the same method (application-managed, system-managed, or library-managed encryption), or the same key server (18a, 18b, 18c), or the same key manager (32a, 32b, 32c), or the same encryption manager (22, 28, 30), or the same interface (12a, 12b), etc. For example, in library-managed encryption, the library 22 specifies which data should be encrypted and the library 22 may also provide the encryption keys to the storage drive 2. Alternatively, the key path 42 may be different from the encryption method 40. For example, in system-managed encryption, a host system component 30 specifies which data should be encrypted but the library 22 may actually provide the encryption keys to the storage drive 2.

The encryption configuration information 20 may only comprise the encryption method 40 or may only comprise the key path 42. In addition, the configuration information 20 may comprise more information than the encryption method 40 and the key path 42. Still further, the encryption configuration information 20 may be stored in more than one location, as discussed above.

The drive may request encryption keys. For example, the library 22 may load encrypted media into storage drive 2. Key management code 14 may determine that the encrypted removable storage media 4 is encrypted and may even determine which key or keys are required to access the data. Key management code 14 may use the key path 42 to request the necessary key(s) from the indicated encryption manager, key manager, key server, library, application, system component, interface, or path. In another example, the library may move media to storage drive 2 and the library may tell the drive, with a message or command over interface 12a, that the media should be encrypted. Or the drive may ask for encryption status (whether or not to encrypt data with respect to the loaded or coupled removable media 4 and/or the particular keys or key labels that should be used) after the media has been moved to the drive. In either case, the drive may then request one or more keys based on the encryption status from the library. Alternatively, the drive may receive encryption keys without requesting them. For example, the library 22 may be configured for library-managed encryption from encryption method 40. When the library 22 moves removable storage media 4 to storage drive 2, it may also provide any required encryption key(s) and/or key labels to storage drive 2. In this case the encryption status is inherently provided, or implied, by the fact that the library provided keys to the drive.

The device 22, host application 30, system component 32, or another coupled device (not shown) may act as a proxy between the storage drive 2 and a key manager 32a, 32b, 32c. The proxy may act as a software or hardware protocol converter, or may provide more complex interactions with the key manager. In addition, the storage drive 2 may be directly coupled to a key manager without any proxy (not shown).

The encryption managers 22, 28 and/or 30 may further provide an encryption algorithm and/or one or more encryption keys or key labels for the encryption engine 16 to use for the coupled removable storage media 4. A key label is an alias, name, signature, hash, or identifier that is used to identify a particular encryption key or keys. Herein key, keys, encryption key, encryption keys, decryption key, decryption keys, key label, and key labels are all used to refer to one or more keys that may be used for encrypting and/or decrypting data or other keys.

In one embodiment, the storage library 22 may be partitioned into one or more logical libraries having multiple storage drives 2. Each storage drive 2 may be configured independently of any other drive. In addition, groups of storage drives may be configured at the same time or with the same settings. This may include all storage drives in a frame, all storage drives in a logical library, all storage drives in a physical library, or all storage drives selected from a list provided by a user interface 8, 10, 36a, 36b, 36c, etc. In this way, different encryption management methods 40 and/or different key paths 42 may be specified for each of the different drives, group of drives, frames, or logical libraries.

The encryption method 40 and/or key path 42 information may be stored in terms of an encryption management method (application-managed, system-managed, library-managed), an encryption manager (storage library 22, application 28, system component 30), a particular communication interface (12a, 12b), a particular device or host system (22, 26, 28, 30), a particular key server (18a, 18b, 18c), a particular key manager (32a, 32b, 32c), etc. Part or all of the encryption configuration information 20 may be stored in, maintained by, or used by the storage drive 2, library 22, the host system 26, the application 30, or the system component 32. For example, the computing environment of FIG. 1 may be configured to support library-managed encryption. The library 22 may use the encryption method 40 to determine when it should operate in a library-managed encryption mode. In another example, the library 22 may include all of the encryption configuration information 20 and the storage drive 2 may not include any. In this example, the library encryption method 40 may be set up for library-managed encryption and the key path 42 may be set as library, or may be set to use interface 10a. In this case, the library not only determines what data or cartridges should be encrypted, but also provides any key(s) to the data storage drive through interface 10a when needed by the drive.

The encryption configuration information 20 may further provide a hierarchical ordering of encryption methods 40 and key paths 42. In this case, the storage drive 2, library 22, the host system 26, the application 30, or the system component 32 prefers to receive encryption method information for a coupled removable storage media 4 from a highest ordered method available and to receive an encryption key from a highest ordered key path available. A hierarchy of encryption methods and key paths provides redundancy so that if a higher order encryption method or key path is unavailable, the required information can be provided from one indicated lower in the hierarchical order.

Figure 3:
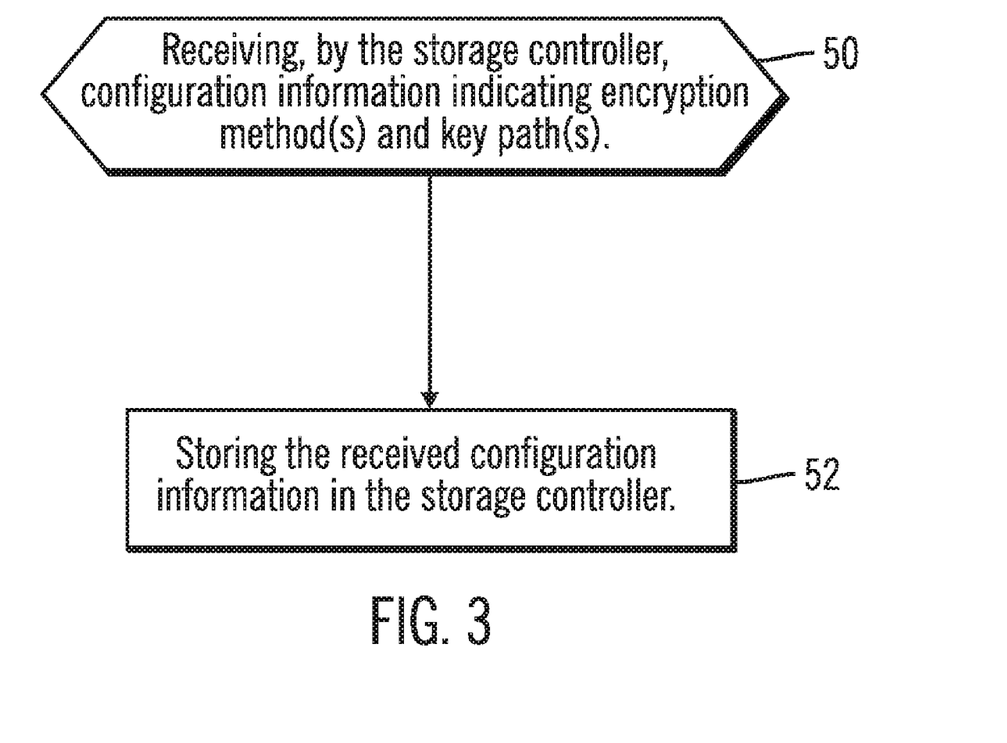
FIG. 3 illustrates an embodiment of storage drive operations to receive key configuration information.

FIG. 3 illustrates an embodiment of operations performed by the storage drive key management code 14 upon receiving (at block 50) configuration information 20 indicating an encryption method 40 and/or key path 42 or hierarchy of encryption methods and/or key paths. In response, the key management code 14 stores (at block 52) the received configuration information 20 in the storage drive non-volatile memory 16. Alternatively, part or all of the configuration information 20 may be received by, and stored by the library 22, application 28, and/or system component 30, as discussed above.

Figure 4:
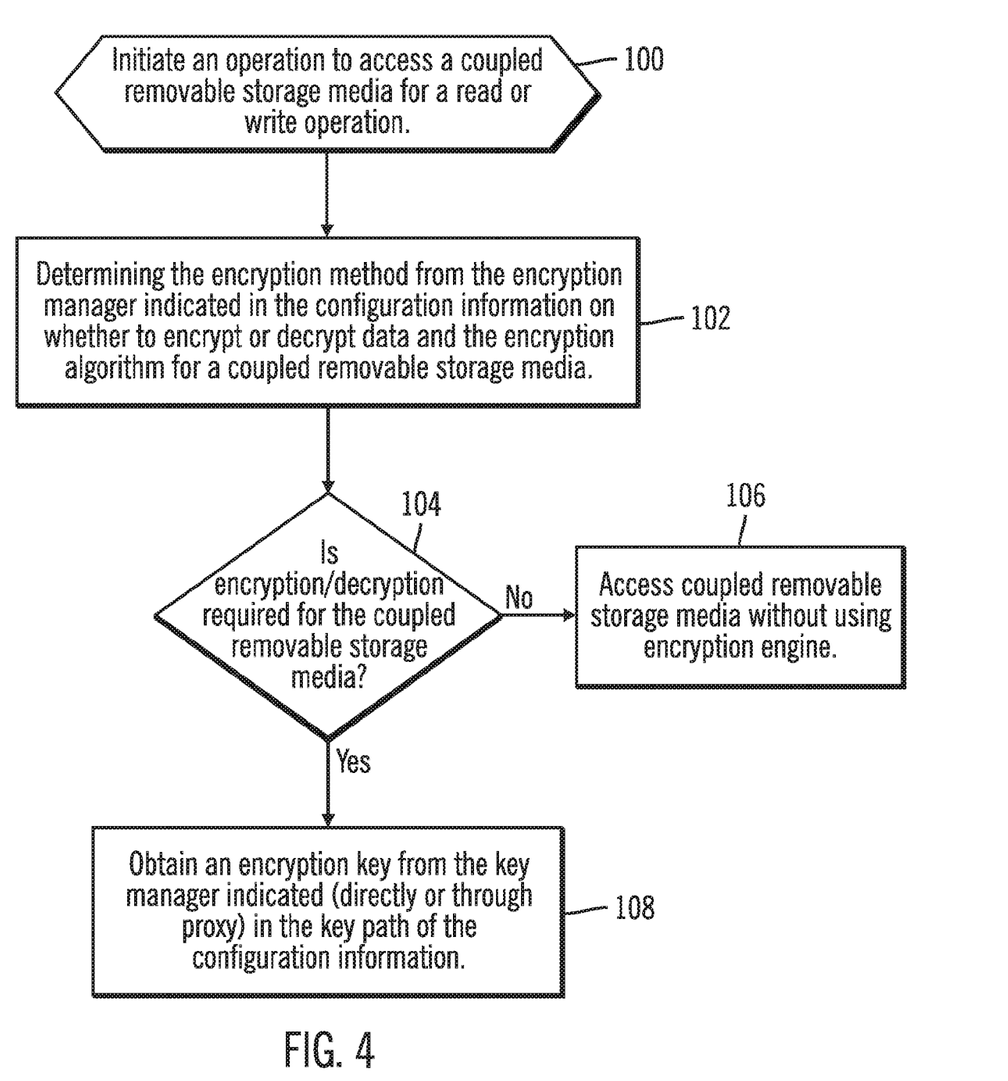
FIGS. 4 and 5 illustrate embodiments of storage drive operations to obtain an encryption method and encryption key to access a coupled removable storage media.

FIG. 4 illustrates an embodiment of operations performed by the storage drive key management code 14 in response to the storage drive 2 initiating (at block 100) an operation to access a coupled removable storage media 4 for read and/or write access. Coupled removable storage media refers to media that is about to be moved, is in the process of being moved, or has already been moved to a data storage drive. The key management code 14 determines (at block 102) the encryption method, i.e., application-managed, system-managed, or library-managed encryption as discussed above. The encryption method is used to determine the media encryption status, which may indicate whether or not to encrypt and/or decrypt data or keys with respect to the coupled removable storage media 4, and/or may include the particular keys or key labels, or may indicate other encryption related information. In one embodiment, the media encryption status for the coupled removable storage media 4, may be provided without solicitation. For example, the encryption method 40 may be maintained by or stored in the library 22. The library 22 may notify the drive through an interface 12a that data needs to be encrypted for the coupled removable storage media 4. The library may also provide the required key(s), or may provide key label(s) identifying the required key(s). In an alternative embodiment, the key management code 14 may request the media encryption status for the removable storage media 4 based on the indicated encryption method. For example, the key management code 14 may request media encryption status from the library 22 over interface 12a if the encryption method 40 is set to library-managed encryption. Yet further, the key management code 14 may determine the encryption status from the encryption manager when initiating a read and/or a write operation or only when initiating a write operation. In one embodiment, the key management code 14 may determine the media encryption status for a read operation by reading the removable storage media 4 and determining that the data is encrypted. The cartridge memory (if used) may also be read from the coupled removable storage media 4 to determine the media encryption status. If the encryption method 40 indicates a hierarchical ordering of encryption methods, then the key management code 14 may use the encryption method information provided by the highest ordered encryption manager available, indicated in the hierarchical ordering.

If (at block 104) the encryption manager 22, 28 or 30 indicates that there is no encryption required with respect to the coupled removable storage media 4, then the I/O manager 6 accesses (at block 106) the coupled removable storage media 4 without using the encryption engine 16. If (at block 104) the encryption manager 22, 28, 30 indicates that encryption is required, then the key management code 14 obtains one or more keys from the key manager 32a, 32b, 32c or proxy 22, 28, 30 by using information specified in the key path 42 of the configuration information 20. In one embodiment, the identified key path 42 (which may comprise the key manager 32a, 32b, 32c or the storage library 22, application 28, or system component 30 functioning as a proxy for the coupled key server) may provide the encryption key without solicitation, or the key management code 14 may request the key(s) from the identified key path. If the configuration information 20 indicates a hierarchical ordering of key paths, then the key management code 14 may use the key path information provided by the highest ordered key path available, indicated in the hierarchical ordering.

The operations of FIG. 4 may be performed each time a cartridge is loaded into storage drive 2, or they may be performed each time a read and/or write operation is about to be performed. In addition, the operations of FIG. 4 may be performed at different times. For example, the encryption method and/or key path may be determined when the storage drive 2 is powered up or reset, or when a cartridge is loaded into storage drive 2. Alternatively, the decision to encrypt may occur each time a read and/or write operation is about to occur.

In one embodiment, the key management code 14 may read one or more encrypted keys from the coupled removable storage media 4 and transmit them to the identified key path to return the unencrypted version of the key(s) that may be used by the encryption engine 16.

Figure 5:
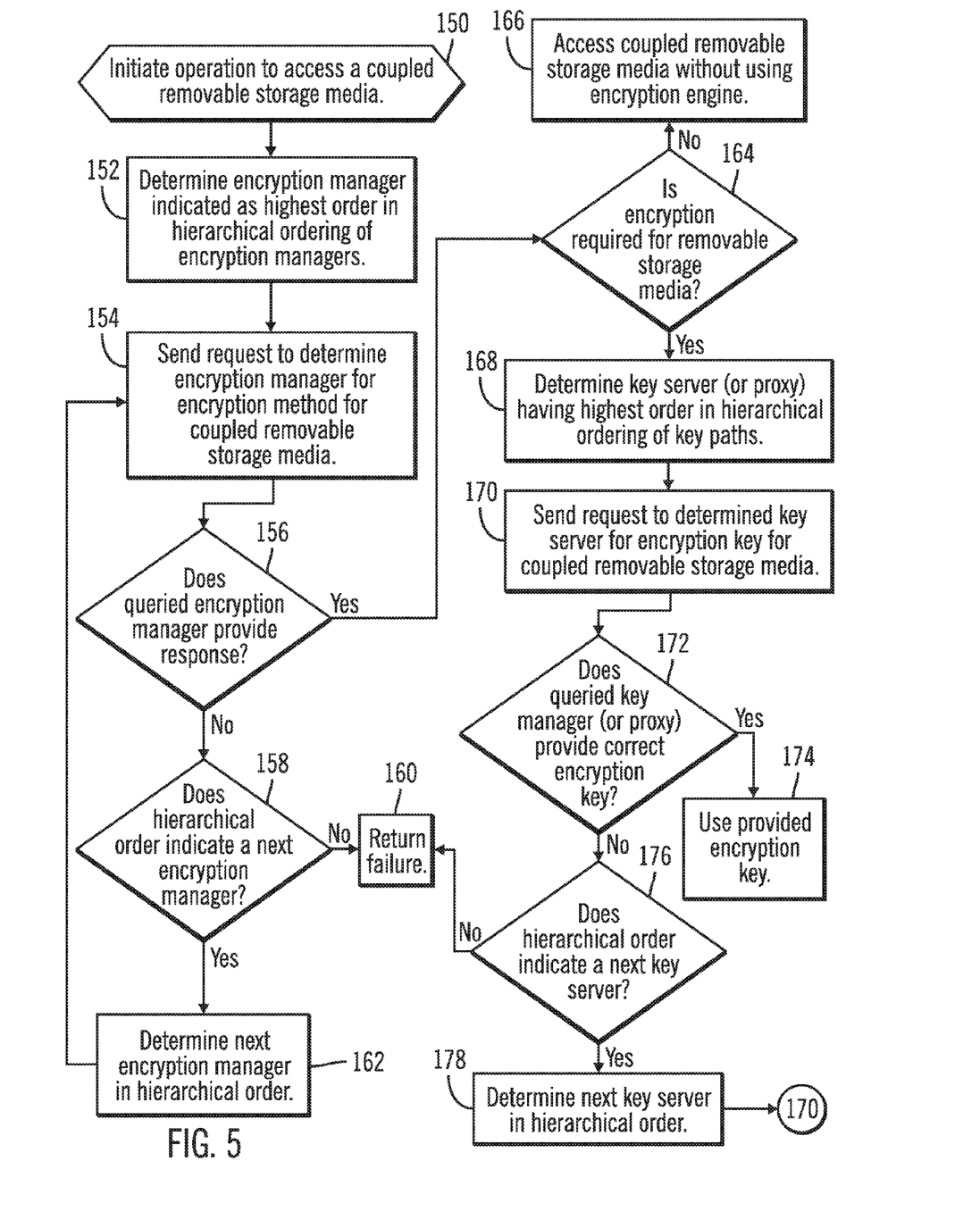

FIG. 5 illustrates an alternative embodiment of operations performed by the storage drive key management code 14 in response to the storage drive 2 initiating (at block 150) an operation to access a coupled removable storage media 4 for a read and/or write operation when the encryption configuration information 20 provides a hierarchical ordering of encryption methods and/or key paths. The key management code 14 determines (at block 152) the encryption method indicated as the highest order in a hierarchical ordering of encryption methods, e.g., storage library 22, host application 28, and system component 30. A request is sent (at block 154) to the determined encryption manager 22, 28 or 30 for the media encryption status for the coupled removable storage media 4, which may indicate whether to perform encryption with respect to the coupled removable storage media 4, and may include the required keys or key labels, or an indication of the encryption algorithm the encryption engine 16 should use or other information. If (at block 156) the queried encryption manager 22, 28 or 30 does not provide a response, then the key management code 14 determines (at block 158) whether the hierarchical order of encryption managers in the encryption method 40 indicates a next external encryption manager 22, 28 or 30 in the hierarchical ordering. If (at block 158) there are no further encryption managers 22, 28 or 30 to consider, then failure is returned (at block 160) because no indicated encryption manager 22, 28 and/or 30 can provide the encryption status.

If (at block 158) there is a further indicated encryption method to consider, then the next encryption method in the hierarchical order indicated in the configuration information 20 is determined (at block 162) and control proceeds back to block 154 to request the encryption status (i.e., whether to encrypt, the particular keys or key labels, etc.).

If (at block 156) the queried encryption manager 22, 28 or 30 provides encryption status and if (at block 164) encryption is not required for the coupled removable storage media 4, then the I/O manager 6 may access (at block 166) the coupled removable storage media 4 without using the encryption engine 16. Otherwise, if encryption is required (at block 164), then the key management code 14 determines (at block 168) the key server (or proxy for the key server 22, 28 or 30) having the highest order in the hierarchical ordering of key paths. A request is sent (at block 170) to the determined key server (or proxy 22, 28, or 30) for the encryption key for the coupled removable storage media 4. If an encrypted key is accessed from the coupled removable storage media 4, then the request may include the encrypted key. If (at block 172) the queried key manager 18a, 18b, 18c (or proxy 22, 28 or 30) provides a correct encryption key, i.e., one that works with respect to the coupled removable storage media 4, then the encryption engine 16 uses (at block 174) the received encryption key to encrypt and/or decrypt with respect to the coupled removable storage media 4. If (at block 172) the queried key manager 18a, 18b, 18c (or proxy) does not provide a working encryption key, i.e., does not respond or the key provided does not work, then the key management code 14 determines (at block 176) whether the key path hierarchical order indicates a next key manager (or proxy). If (at block 176) another key path is not provided, then failure is returned (at block 160). If another key path is indicated in the configuration information 20, then the next key manager 32a, 32b, 32c (or proxy 22, 28, or 30) in the hierarchical order of key paths is determined (at block 178) and control proceeds to block 170 to try to obtain the encryption key(s) from the next key path.

With the described embodiments of FIGS. 4 and 5, encryption configuration information 20 may provide to the key management code 14 an encryption method 40 which, for example, may indicate one or more external encryption managers 22, 28 and/or 30 to contact to determine whether encryption should be performed with respect to the coupled removable storage media 4 and other potential information such as an encryption algorithm to use. The encryption configuration information 20 may further indicate one or more key paths 42 to provide an encryption key, where the key path may comprise, for example, one of the possible encryption managers 22, 28 and/or 30, or the key server 18a, 18b, 18c coupled to such potential encryption manger, etc. The one or more encryption managers 22, 28 and/or 30 (or coupled key servers 18a, 18b, 18c) identified as the key path may be different than the one or more encryption managers 22, 28 and/or 30 identified as the external encryption manager to provide the encryption method.

Figure 6:
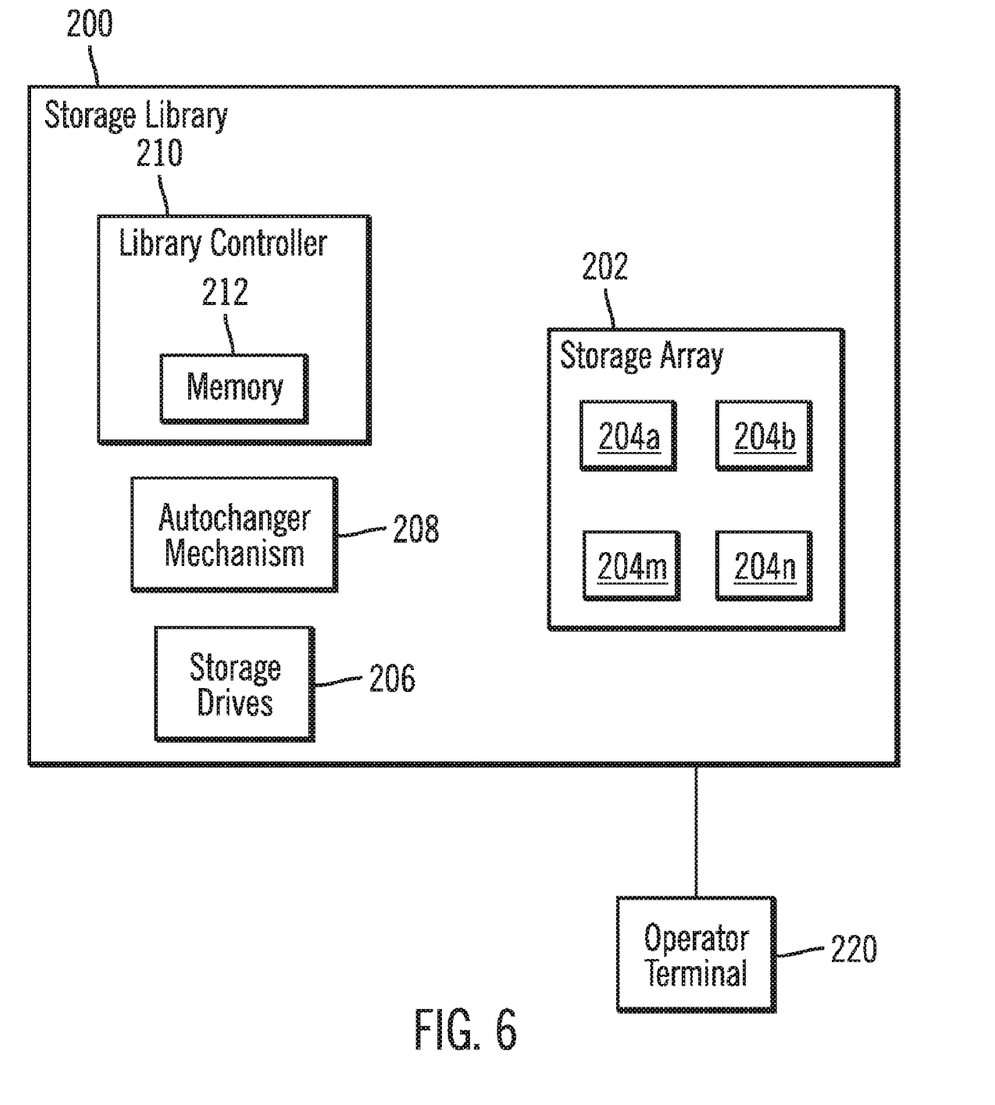
FIG. 6 illustrates an embodiment of components in a storage library.

FIG. 6 illustrates an embodiment of an automated storage library 200, such as storage library 22, including a storage array 202, such as storage cells, including removable storage media 204b . . . 204n; storage drives 206, such as a tape drive, optical disk drive or other removable media storage drive to which a removable storage media is coupled to for access; an autochanger mechanism 208 to transfer removable storage media 204a, 204b . . . 204n between the storage array 202 and storage drives 206, such as a picker assembly; and a library controller 210. An example of a library 200 is the IBM 3584 UltraScalable Tape Library.

The removable storage media 204a, 204b . . . 204n may comprise removable storage media 4. In certain embodiments, the library controller 210 is comprised of a microprocessor and various controls and interfaces to control the operation of the components in the automated library 200, including the autochanger mechanism 208 and storage drives 206. The library controller 210 utilizes a memory 212 to store various information, such as a storage media map maintaining information on the location of removable storage media 204a, 204b . . . 204n in the library 200, including the contents of library elements in the storage array 202. The library controller 210 may comprise a single processing unit, multiple redundant processing units, and/or multiple distributed processing units.

The library controller 210 may further manage read/write operations with respect to removable storage media 204a, 204b . . . 204n in the library 200. A library operator may directly control operations and the management of removable storage media 204a, 204b . . . 204n through an operator terminal 220 coupled to the library 200, consisting of a display device and keyboard, to interface with the library controller 210. The operator terminal 220 may comprise a computer, workstation, personal computer, palm computer, operator panel, entry keys and a display, web user interface, proprietary user interface, or any other device or interface capable of providing a user interface for the library 200. Additionally, a host system (not shown) may send commands to the library controller 210 to control the movement of media within the automated library 200. A host system (not shown) may also send commands to storage drives 206 to perform read and/or write operations on with respect to removable storage media 204a, 204b . . . 204n. The host system(s) may communicate with the library 200 and/or the storage drives 206 over one or more networks or interfaces. The host interface(s) may comprise serial, parallel, or optical interfaces such as, but without limitation, RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, the host interface(s) may comprise network or wireless interfaces such, but without limitation, as Ethernet, SAN (Storage Area Network), WAN (Wide Area Network), CAN (Controller Area Network), 802.11 (Wi-Fi), X.25 (WAN), Bluetooth, etc. Still further, the host interface(s) may comprise combinations thereof.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The encryption manager that may be indicated in the encryption method 40 is described as comprising a storage library 22, application 28 and/or 30. In further embodiments, different types of components, hardware and/or software, may be designated as encryption managers in the encryption method 40 configuration information.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving, at a storage drive, a request to access a removable storage media coupled to the storage drive to perform read and write operations with respect to the coupled removable storage media;
    obtaining, by the storage drive, encryption status for the coupled removable storage media from an encryption manager;

determining, by the storage drive, from the obtained encryption status whether to encrypt the coupled removable storage media to access;

obtaining, by the storage drive, at least one key from a key manager in response to determining to encrypt with respect to the coupled removable storage media; and performing, by the storage drive, data operations using the at least one key to encrypt data.

2. The method of claim 1, wherein the encryption manager is a member of a set of encryption managers comprising a host application, a host system component, and a storage library.

3. The method of claim 2, wherein the storage drive obtains the encryption status from the host application and host system component over a first communication interface and obtains the encryption status from the storage library over a second communication interface.

4. The method of claim 1, wherein the key manager is associated with a host application, a host system component or a storage library.

5. The method of claim 4, wherein the storage drive obtains the at least one key from the key manager associated with the host application and the host system component over a first communication interface and obtains the at least one key from the key manager associated with the storage library over a second communication interface.

6. The method of claim 1, wherein the storage drive obtains the encryption status by requesting the encryption status from the encryption manager.

7. The method of claim 1, wherein the storage drive obtains the encryption status from the encryption manager without soliciting the encryption status from the encryption manager.

8. The method of claim 1, wherein the storage drive obtains the at least one key by requesting the at least one key from the key manager.

9. The method of claim 1, wherein the storage drive obtains the at least one key from the key manager without soliciting the at least one key from the key manager.

10. The method of claim 1, wherein the at least one key is obtained from the key manager by using an encryption manager as a proxy for the key manager.

11. The method of claim 1, wherein the encryption manager comprises the key manager.

12. The method of claim 1, further comprising:

receiving, at the storage drive, drive configuration information indicating at least one encryption method, wherein each encryption method indicates an encryption manager that provides the encryption status; and storing, by the storage drive, the received configuration information in the storage drive.

13. The method of claim 12, wherein the configuration information indicates a hierarchical encryption manager ordering of encryption managers, wherein the available encryption manager having a highest order in the hierarchical encryption manager ordering provides the encryption status.

14. The method of claim 1, further comprising:

receiving, at the storage drive configuration information indicating at least one key path, wherein each key path indicates the key manager that provides the at least one key; and storing, by the storage drive, the received configuration information in the storage drive.

15. The method of claim 14, wherein the configuration information indicates a hierarchical key path ordering of key paths, wherein the at least one key is obtained from the available key manager having a highest order in the hierarchical key path ordering.

16. A system in communication with an encryption manager and key manager, and capable of being coupled to a removable storage media, comprising:

an Input/Output manager enabled to receive a request to access the coupled removable storage media and perform read and write operations with respect to the coupled removable storage media;

key management code enabled to perform operations comprising:

obtaining encryption status for the coupled removable storage media from an encryption manager;

determining from the obtained encryption status whether to encrypt the coupled removable storage media to access;

obtaining at least one key from a key manager in response to determining to encrypt with respect to the coupled removable storage media; and an encryption engine enabled to perform data operations using the at least one key to encrypt data.

17. The system of claim 16, wherein the encryption manager is a member of a set of encryption managers comprising a host application, a host system component, and a storage library.

18. The system of claim 17, further comprising:

a first communication interface through which the encryption status from the host application and host system component is obtained; and a second communication interface through which the encryption status from the storage library is obtained.

19. The system of claim 16, wherein the key manager is associated with a host application, a host system component or a storage library.

20. The system of claim 19, further comprising:

a first communication interface through which the at least one key from the key manager associated with the host application and the host system component is obtained; and a second communication interface through which the at least one key from the key manager associated with the storage library is obtained.

21. The system of claim 16, wherein the key management code obtains the encryption status by requesting the encryption status from the encryption manager.

22. The system of claim 16, wherein the key management code obtains the encryption status from the encryption manager without soliciting the encryption status from the encryption manager.

23. The system of claim 16, wherein the key management code obtains the at least one key by requesting the at least one key from the key manager.

24. The system of claim 16, wherein the key management code obtains the at least one key from the key manager without soliciting the at least one key from the key manager.

25. The system of claim 16, wherein the at least one key is obtained from the key manager by using one of the encryption managers as a proxy for the key manager.

26. The system of claim 16, wherein the encryption manager comprises the key manager.

27. The system of claim 16, wherein the key management code is further enabled to perform:

receiving configuration information indicating at least one encryption method, wherein each encryption method indicates an encryption manager that provides the encryption status; and storing the received configuration information in the storage drive.

28. The system of claim 27, wherein the configuration information indicates a hierarchical encryption manager ordering of encryption managers, wherein the available encryption manager having a highest order in the hierarchical encryption manager ordering provides the encryption status.

29. The system of claim 16, wherein the key management code is further enabled to perform:
   receiving configuration information indicating at least one key path, wherein each key path indicates the key manager that provides the at least one key; and
   causing the storing of the received configuration information in the storage drive.

30. The system of claim 29, wherein the configuration information indicates a hierarchical key path ordering of key paths, wherein the at least one key is obtained from the available key manager having a highest order in the hierarchical key path ordering.

31. The system of claim 16, further comprising:
   at least one storage drive, wherein the encryption engine, I/O manager, and key management code are included within each instance of the storage drive;
   a storage array including a plurality of removable storage media capable;
   an autochanger mechanism enabled to transfer removable storage media in the storage array to the at least one storage drive to couple the removable storage media to the at least one storage drive; and
   a controller to control operations of the storage drive and the autochanger mechanism.

32. An article of manufacture including code implemented in a device in a storage drive and executed to perform operations with respect to an encryption manager, key manager, and removable storage media coupled to the storage drive, the operations comprising:
   receiving a request to access a coupled removable storage media to perform read and write operations with respect to the coupled removable storage media;
   obtaining encryption status for the removable storage media from an encryption manager;
   determining from the obtained encryption status whether to encrypt the coupled removable storage media to access;
   obtaining at least one key from a key manager in response to determining to encrypt with respect to the coupled removable storage media; and
   performing data operations using the at least one key to encrypt data.

33. The article of manufacture of claim 32, wherein the encryption manager is a member of a set of encryption managers comprising a host application, a host system component, and a storage library.

34. The article of manufacture of claim 33, wherein the encryption status is obtained from the host application and host system component over a first communication interface and the encryption status is obtained from the storage library over a second communication interface.

35. The article of manufacture of claim 32, wherein the key manager is associated with a host application, a host system component or a storage library.

36. The article of manufacture of claim 35, wherein the at least one key is obtained from the key manager associated with the host application and the host system component over a first communication interface and wherein the at least one key is obtained from the key manager associated with the storage library over a second communication interface.

37. The article of manufacture of claim 32, wherein the encryption status is obtained by requesting the encryption status from the encryption manager.

38. The article of manufacture of claim 32, wherein the encryption status is obtained from the encryption manager without soliciting the encryption status from the encryption manager.

39. The article of manufacture of claim 32, wherein the at least one key is obtained by requesting the at least one key from the key manager.

40. The article of manufacture of claim 32, wherein the at least one key is obtained from the key manager without soliciting the at least one key from the key manager.

41. The article of manufacture of claim 32, wherein the at least one key is obtained from the key manager by using an encryption manager as a proxy for the key manager.

42. The article of manufacture of claim 32, wherein the encryption manager comprises the key manager.

43. The article of manufacture of claim 32, wherein the operations further comprise:
   receiving drive configuration information indicating at least one encryption method, wherein each encryption method indicates an encryption manager that provides the encryption status; and
   storing the received configuration information in the storage drive.

44. The article of manufacture of claim 43, wherein the configuration information indicates a hierarchical encryption manager ordering of encryption managers, wherein the available encryption manager having a highest order in the hierarchical encryption manager ordering provides the encryption status.

45. The article of manufacture of claim 32, wherein the operations further comprise:
   receiving configuration information indicating at least one key path, wherein each key path indicates the key manager that provides the at least one key; and
   storing the received configuration information in the storage drive.

46. The article of manufacture of claim 45, wherein the configuration information indicates a hierarchical key path ordering of key paths, wherein the at least one key is obtained from the available key manager having a highest order in the hierarchical key path ordering.

* * * * *